US012694022B2

(12) United States Patent
Song et al.

(10) Patent No.: US 12,694,022 B2
(45) Date of Patent: Jul. 28, 2026

(54) STRUCTURED QUERY LANGUAGE EVALUATION METHOD, ELECTRONIC DEVICE AND STORAGE MEDIUM

(71) Applicant: Beijing Baidu Netcom Science Technology Co., Ltd., Beijing (CN)

(72) Inventors: Wenli Song, Beijing (CN); Mingyang Dai, Beijing (CN); Dongchang Lei, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/975,762

(22) Filed: Dec. 10, 2024

(65) Prior Publication Data

US 2026/0079931 A1 Mar. 19, 2026

(30) Foreign Application Priority Data

Sep. 19, 2024 (CN) .......................... 202411310804.1

(51) Int. Cl.
*G06F 16/2452* (2019.01)
*G06F 16/242* (2019.01)

(52) U.S. Cl.
CPC .... *G06F 16/24522* (2019.01); *G06F 16/2423* (2019.01); *G06F 16/2433* (2019.01)

(58) Field of Classification Search
CPC ........... G06F 16/24522; G06F 16/2433; G06F 16/2423
See application file for complete search history.

(56) References Cited

FOREIGN PATENT DOCUMENTS

| CN | 113946600 A | * | 1/2022 |
| CN | 119127912 A | * | 12/2024 |
| CN | 119201966 A | * | 12/2024 |

* cited by examiner

*Primary Examiner* — Khanh B Pham
*Assistant Examiner* — Ranjit P Doraiswamy
(74) *Attorney, Agent, or Firm* — Banner & Witcoff, Ltd.

(57) ABSTRACT

Provided is a structured query language evaluation method, an electronic device and a storage medium, relating to a technical field of data processing, and specifically to technical fields of large model and natural language processing. The method includes: obtaining a query question; generating a predicted structured query language based on the query question by using a large language model; in presence of a target structured query language, evaluating accuracy of the predicted structured query language based on the predicted structured query language and the target structured query language to obtain an evaluation result corresponding to the predicted structured query language; and in absence of the target structured query language, evaluating the accuracy of the predicted structured query language based on a semantic analysis result of the predicted structured query language to obtain the evaluation result corresponding to the predicted structured query language.

9 Claims, 4 Drawing Sheets

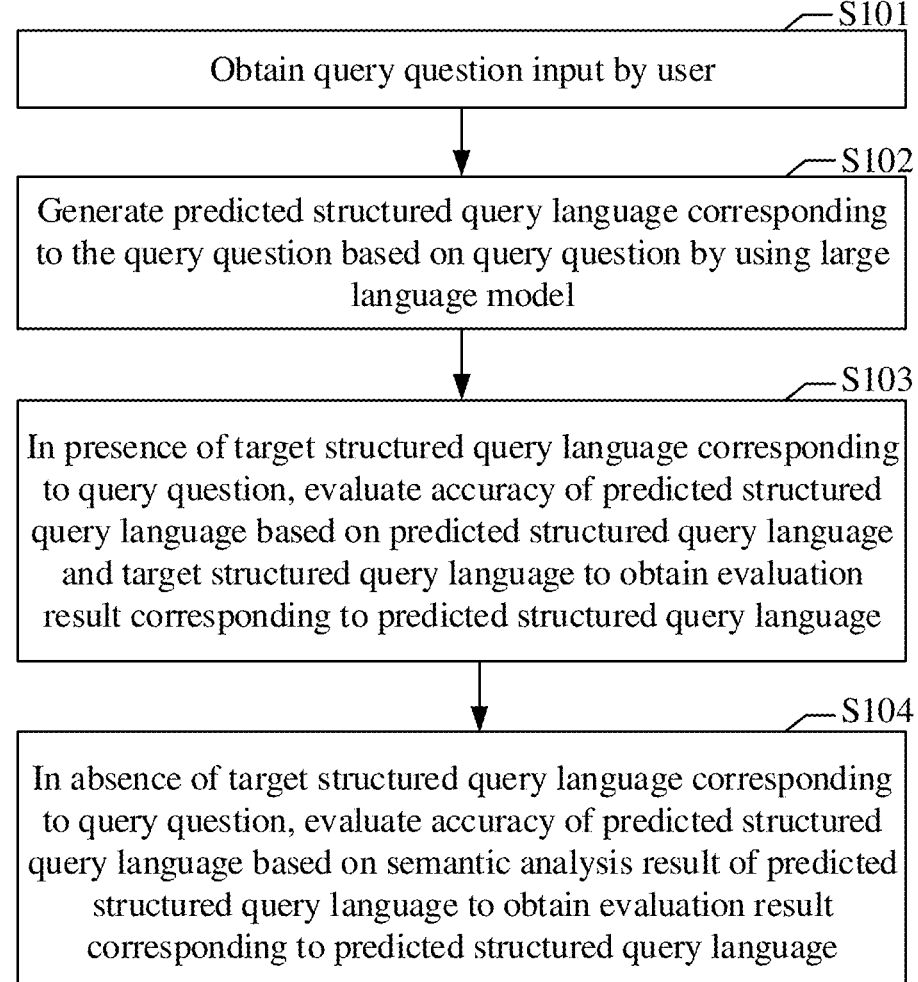

S101

Obtain query question input by user

S102

Generate predicted structured query language corresponding to the query question based on query question by using large language model

S103

In presence of target structured query language corresponding to query question, evaluate accuracy of predicted structured query language based on predicted structured query language and target structured query language to obtain evaluation result corresponding to predicted structured query language

S104

In absence of target structured query language corresponding to query question, evaluate accuracy of predicted structured query language based on semantic analysis result of predicted structured query language to obtain evaluation result corresponding to predicted structured query language

FIG. 1

STRUCTURED QUERY LANGUAGE EVALUATION METHOD, ELECTRONIC DEVICE AND STORAGE MEDIUM

CROSS-REFERENCE TO RELATED APPLICATIONS

The present application claims priority to Chinese Patent Application No. CN202411310804.1, filed with the China National Intellectual Property Administration on Sep. 19, 2024, the disclosure of which is hereby incorporated herein by reference in its entirety.

TECHNICAL FIELD

The present disclosure relates to a technical field of data processing, specifically to technical fields of large model and natural language processing, and in particular, to a structured query language evaluation method and apparatus, a device and a medium.

BACKGROUND

With continuous advancement of a database technology, SQL (Structured Query Language) has become an indispensable tool for data processing and analysis. However, writing effective SQL not only requires developers to have solid logical thinking skills, but also requires them to have a deep understanding of database operations. Facing increasingly complex business demands, ensuring correctness, semantic accuracy, and high efficient execution of the SQL is a major challenge for the developers.

It follows that providing an effective method for evaluating SQL accuracy is of great significance for improving development efficiency and ensuring data processing quality.

SUMMARY

The present disclosure provides a structured query language evaluation method and apparatus, a device and a medium.

According to an aspect of the present disclosure, a structured query language evaluation method is provided, which includes:

obtaining a query question input by a user;

generating a predicted structured query language corresponding to the query question based on the query question by using a large language model;

in presence of a target structured query language corresponding to the query question, evaluating accuracy of the predicted structured query language based on the predicted structured query language and the target structured query language to obtain an evaluation result corresponding to the predicted structured query language; and in absence of the target structured query language corresponding to the query question, evaluating the accuracy of the predicted structured query language based on a semantic analysis result of the predicted structured query language to obtain the evaluation result corresponding to the predicted structured query language.

According to another aspect of the present disclosure, a structured query language evaluation apparatus is provided, which includes:

an obtaining module configured to obtain a query question input by a user;

a generation module configured to generate a predicted structured query language corresponding to the query question based on the query question by using a large language model;

a first evaluation module configured to, in presence of a target structured query language corresponding to the query question, evaluate accuracy of the predicted structured query language based on the predicted structured query language and the target structured query language to obtain an evaluation result corresponding to the predicted structured query language; and a second evaluation module configured to, in absence of the target structured query language corresponding to the query question, evaluate the accuracy of the predicted structured query language based on a semantic analysis result of the predicted structured query language to obtain the evaluation result corresponding to the predicted structured query language.

According to a third aspect of the present disclosure, an electronic device is provided, which includes:

at least one processor; and a memory connected in communication with the at least one processor;

the memory stores an instruction executable by the at least one processor, and the instruction, when executed by the at least one processor, enables the at least one processor to execute the method described by any one of above technical solutions.

According to a fourth aspect of the present disclosure, a non-transitory computer-readable storage medium storing a computer instruction thereon is provided, where the computer instruction is used to cause a computer to execute the method described by any one of above technical solutions.

According to a fifth aspect of the present disclosure, a computer program product is provided, which includes a computer program, the computer program, when executed by a processor, implements the method described by any one of above technical solutions.

The present disclosure provides a structured query language evaluation method and apparatus, a device and a storage medium. By receiving the query question input by the user and using the large language model to generate the corresponding predicted structured query language, the present disclosure significantly improves conversion efficiency from natural language to the structured query language. Secondly, the present disclosure evaluates accuracy of a predicted statement by comparing the predicted structured query language with the target structured query language in the presence of the target structured query language. In the absence of the target structured query language, the accuracy of the predicted statement is evaluated through in-depth semantic analysis. It can be seen that the solution of the present disclosure can effectively evaluate the generated predicted structured query language regardless of whether there is the target structured query language as a reference, thereby improving the accuracy of predicted structured query language evaluation.

It should be understood that contents described in this part is not intended to identify critical or important features of the embodiments of the present disclosure, nor is it intended to limit the scope of the present disclosure. The other features of the present disclosure are made easy to understand by the following description.

BRIEF DESCRIPTION OF THE DRAWINGS

Accompanying drawings are provided for a better understanding of the present scheme and do not constitute a limitation of the present disclosure, in which:

FIG. 1 is a step schematic diagram of a structured query language evaluation method in embodiments of the present disclosure;

DETAILED DESCRIPTION

Figure 2:
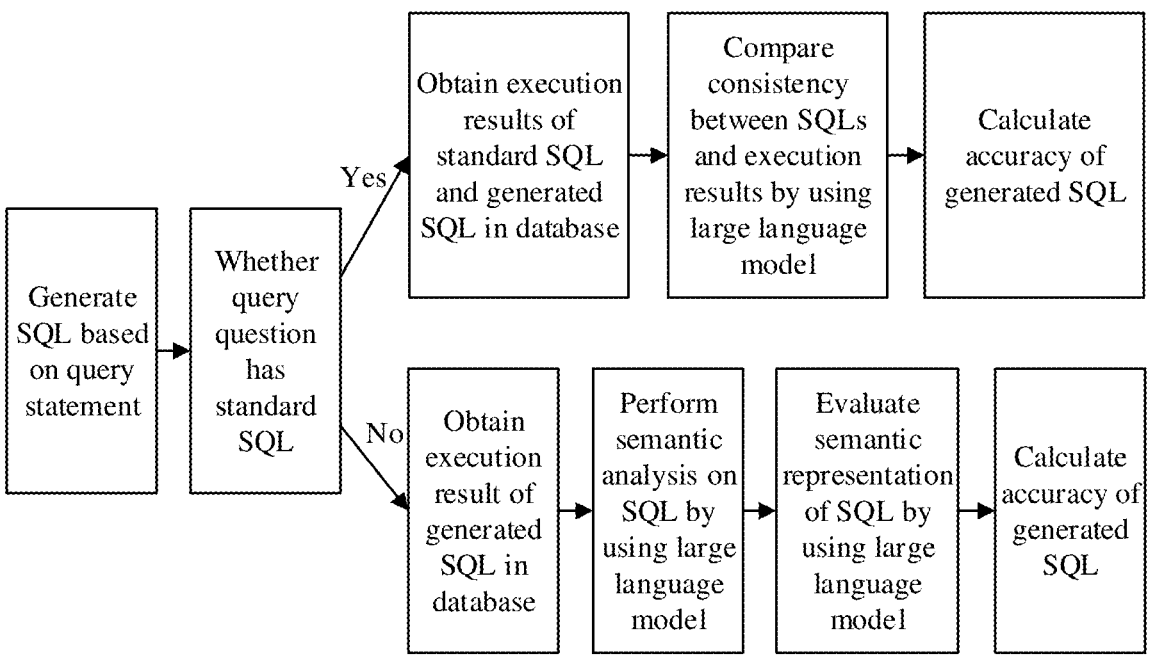
FIG. 2 is a flow schematic diagram corresponding to a structured query language evaluation method in embodiments of the present disclosure.

Hereinafter, explanation of exemplary embodiments of the present disclosure will be made in conjunction with the accompanying drawings, which includes various details of the embodiments of the present disclosure to facilitate understanding and should be considered merely exemplary. Therefore, those having ordinary skill in the art should recognize that various changes and modifications may be made to the embodiments described herein without departing from the scope of the present disclosure. Similarly, for clarity and conciseness, descriptions of well-known functions and structures are omitted in the following descriptions.

In related technical solutions, following manners are generally used to evaluate a SQL:

A first manner refers to firstly generating a SQL through an evaluation model and then comparing a matching degree between the SQL generated by the model and a standard SQL to determine accuracy of the generated SQL. This evaluation manner has a potential for underestimation. For example, in practical applications, although the execution result of the generated SQL is correct, if the generated SQL does not completely match the standard SQL at a string level, which may only be a difference between orders of SELECT columns, or use of SQLs with the same function but different expressions, it may be considered that there is a problem with a query and thus lead to misjudgment.

A second manner refers to firstly converting the generated SQL and the standard SQL into a standard form after generating the SQL and then calculating the matching degree therebetween, thereby obtaining an evaluation result. This evaluation manner effectively solves a misjudgment problem caused by different orders of columns through a manner of standardized expression. In addition, this method sorts elements such as columns and tables in a SQL query and standardizes aliases used in the SQLs, which may also reduce misjudgments caused by format differences. Although this method may effectively solve the misjudgment problem caused by the first manner to some extent, it cannot handle semantic changes of a relatively complex SQL.

A third manner refers to evaluating accuracy of the SQL query by calculating a proportion of a quantity of correct execution results of the generated SQL in a whole dataset. That is, if a SQL query returns a result that matches an expected result, the query is considered accurate. This manner only requires a result finally returned by a database execution engine to be consistent with an execution result of a correct SQL, but it cannot guarantee that the generated SQL is semantically correct, which may lead to artificially high accuracy.

In addition, in enterprise application scenarios, there are often only query problems, making it difficult to obtain the standard SQL that matches the generated SQL on a large scale. In this case, traditional evaluation manners may not be fully effective.

In order to solve the above problems, the present disclosure provides a structured query language evaluation method. Referring to FIG. 1 which is a step schematic diagram of the structured query language evaluation method in embodiments of the present disclosure, the method includes following steps.

In step S101, a query question input by a user is obtained.

Specifically, obtaining the query question input by the user is the first step in a data processing flow, which involves receiving and understanding a data retrieval request made by the user in a natural language form. During this step, a system firstly needs to be able to receive an input of the user, which may be a query instruction in a text form, a voice form, or other forms. Subsequently, the natural language processing (NLP) technology is used to parse and understand intent and content of the query, including identifying key information such as an operation object, a conditional constraint, and the like. The step of obtaining the query question input by the user may lay a foundation for effective communication between the user and a database, ensuring that subsequent steps, such as generating a corresponding SQL by using a large language model, can accurately reflect query needs of the user.

In step S102, a predicted structured query language corresponding to the query question is generated based on the query question by using the large language model.

Specifically, after obtaining the query question input by the user, the large language model is used to generate the predicted structured query language (also known as the predicted SQL) corresponding to the query question. When the user makes a query request in the natural language form, the large language model firstly parses semantic content of the query, identifies key information such as a data field to be retrieved, a condition, and a data table that may be involved. Then, the large language model applies its deep learning algorithm to convert natural language descriptions into precise SQLs which are structured, and mean they follow a strict syntax rule and may be executed directly in a database management system to retrieve or manipulate data. In this way, by adopting the large language model, human language can be automatically translated into codes that a machine may understand and execute, greatly improving efficiency of data processing and user convenience. The large language model may be, for example, the ERNIE Bot model.

In step S103, in presence of a target structured query language corresponding to the query question, accuracy of the predicted structured query language is evaluated based on the predicted structured query language and the target structured query language to obtain an evaluation result corresponding to the predicted structured query language.

Specifically, it should be noted that, for the target structured query language (also known as a target SQL), while obtaining the query question input by the user, it is possible to determine whether the query question has a corresponding target structured query language. That is, the target SQL is usually a pre-defined and known statement that can accurately reflect the query needs of the user.

If there is a pre-defined target structured query language (SQL) statement that directly corresponds to the query question of the user, accuracy of a predicted statement is evaluated by comparing the predicted SQL generated by the large language model with the target SQL. During comparison, it usually involves a detailed comparative analysis of structure, syntax, and logic of both to determine whether the predicted statement can accurately reflect intent and requirements of an original query, thereby obtaining the corresponding evaluation result. The evaluation result is usually presented in an indicator such as a score, a percentage, or other forms that indicates a matching degree between the predicted SQL and a target statement, thereby providing direct feedback about quality of its generated statement for the system. As such, the embodiments of the present application provide a clear and direct evaluation mechanism, which enables the accuracy of the predicted SQL to be effectively verified, thereby improving accuracy of SQL evaluation.

In step S104, in absence of the target structured query language corresponding to the query question, the accuracy of the predicted structured query language is evaluated based on a semantic analysis result of the predicted structured query language to obtain the evaluation result corresponding to the predicted structured query language.

Specifically, in absence of the target structured query language (SQL) statement directly corresponding to the query question, the accuracy of the predicted SQL is evaluated through in-depth semantic analysis. Where the semantic analysis is a technique for understanding a meaning of a text, which can identify and interpret keywords, operations, and logical relationships in the SQL. In this process, the natural language processing technology is firstly used to parse semantic content in the predicted SQL. Then, these statements are evaluated based on a preset semantic rule and a database schema, to determine whether they logically conform to original query intent of the user. Finally, the corresponding evaluation results may be obtained. This method allows for effective accuracy evaluation of the generated SQL without clear reference standards, ensuring that they can be executed correctly in practical applications.

The present disclosure provides a structured query language evaluation method and apparatus, a device and a storage medium. By receiving the query question input by the user and using the large language model to generate the corresponding predicted structured query language, the present disclosure significantly improves conversion efficiency from the natural language to the structured query language. Furthermore, the present disclosure evaluates the accuracy of the predicted statement by comparing the predicted structured query language with the target structured query language in the presence of the target structured query language. In the absence of the target structured query language, the accuracy of predicted statement is evaluated through in-depth semantic analysis. As such, it can be seen that the solution of the present disclosure can effectively evaluate the generated predicted structured query language regardless of whether there is the target structured query language as a reference, thereby improving the accuracy of predicted structured query language evaluation.

In some optional embodiments, evaluating the accuracy of the predicted structured query language based on the predicted structured query language and the target structured query language to obtain the evaluation result corresponding to the predicted structured query language includes:

obtaining a first execution result corresponding to the predicted structured query language;
 obtaining a second execution result corresponding to the target structured query language; and
 evaluating the accuracy of the predicted structured query language based on the first execution result and the second execution result to obtain the evaluation result corresponding to the predicted structured query language.

Specifically, when the accuracy of the predicted structured query language is evaluated in the presence of the target structured query language corresponding to the query question, the predicted SQL is firstly executed to obtain the first execution result, and then the target SQL is executed to obtain the second execution result.

Next, the first execution result is compared with the second execution result to analyze a similarity and a difference therebetween. The comparison may include checking a quantity of returned data rows, data content, a data order, and any potential exception or error. Based on these comparison results, the accuracy of the predicted SQL may be evaluated, thus the evaluation result is obtained. The evaluation result may include a score, grade, or other form of feedback that clearly indicates the matching degree between the predicted statement and the target statement. This evaluation result is crucial for optimizing the language model, improving accuracy of SQL generation, and ultimately enhancing user satisfaction.

In this way, by obtaining the execution results of the predicted SQL and the target SQL and comparing these two results in detail, the accuracy of the predicted statement may be quantified, which is further beneficial for timely detection and correction of a possible deviation.

In some optional embodiments, evaluating the accuracy of the predicted structured query language based on the first execution result and the second execution result to obtain the evaluation result corresponding to the predicted structured query language includes:

comparing the predicted structured query language and the target structured query language in terms of syntax to obtain a first comparison result;
 comparing consistency between the first execution result and the second execution result to obtain a second comparison result;
 obtaining first preliminary evaluation results based on the first comparison result and the second comparison result; and
 obtaining the evaluation result corresponding to the predicted structured query language based on the first preliminary evaluation results.

Specifically, the predicted SQL is first compared with a pre-defined and accurate target SQL in terms of syntax. This step aims to check consistency of the predicted SQL and the target SQL in terms of structure and syntax rule, resulting in the first comparison result. Next, these two statements are executed to obtain their first and second execution results, and then these two sets of results are compared to verify whether they return the same or logically equivalent data, thus obtaining the second comparison result. In combination with the first comparison result and the second comparison result, the system generates the preliminary evaluation results that synthesize grammatical correctness and consistency of the execution results. Finally, based on the preliminary evaluation results, the system further analyzes and obtains the final evaluation result, providing quantitative feedback for the accuracy of the predicted SQL. This process ensures that the generated SQL is not only formally correct, but also functionally accurate in executing the query intent of the user, thereby improving reliability and effectiveness of an automatic SQL generation system.

In this way, first, correctness of the structure of the statement is ensured by comparing the predicted SQL with the target SQL in terms of syntax, and then logical correctness and data accuracy of the statement are verified through result consistency comparison. By comparing these two steps of comparisons, the preliminary evaluation result can be generated, and the final evaluation result can be obtained, which not only improves reliability of predicted SQL, but also enhances accuracy of the entire system and user trust, ensuring efficiency of a data processing process and precise satisfaction of a user query requirement. By comprehensively comparing syntax consistency between the predicted SQL and the target SQL, as well as data consistency of their respective execution results, a comprehensive evaluation of the accuracy of the predicted SQL has been achieved.

In some optional embodiments, obtaining the evaluation result corresponding to the predicted structured query language based on the first preliminary evaluation results includes:

obtaining a quantity of correct evaluations in the first preliminary evaluation results; and calculating a ratio between the quantity of the correct evaluations and a total quantity of the first preliminary evaluation results, and taking the ratio as the evaluation result corresponding to the predicted structured query language.

Specifically, after obtaining the first preliminary evaluation results, as the first preliminary evaluation results include both correctly evaluated and incorrectly evaluated results, the embodiments of the present disclosure need to count the quantity of the correct evaluations results from the preliminary evaluation results, that is, a quantity of cases where the predicted SQL perfectly matches the target SQL in terms of syntax and execution results. Subsequently, the quantity of the correct evaluations is compared with the total quantity of the preliminary evaluation results to calculate the ratio. The ratio reflects a percentage of correctness of the predicted SQL in all evaluation items, providing an intuitive and quantifiable evaluation result to measure overall accuracy of the predicted statement. The method makes the evaluation result more objective and accurate, which helps further optimize the language model and improve the accuracy of SQL generation.

In this way, by extracting the quantity of the correct evaluations from the preliminary evaluation results and calculating the ration between this number and the total quantity of evaluations, a quantitative evaluation of the accuracy of the predicted SQL may be achieved. The method not only provides a clear indicator to measure the accuracy of the predicted statement, but also objectively reflects overall performance of the predicted statement in all evaluation items through proportional calculation. In addition, such the quantitative evaluation mechanism helps quickly identify and improve deficiencies in the prediction process, significantly improving the accuracy and reliability of SQL generation, optimizing user experience, and providing strong data support for continuous improvement of language models.

In some optional embodiments, evaluating the accuracy of the predicted structured query language based on the semantic analysis result of the predicted structured query language to obtaining the evaluation result corresponding to the predicted structured query language includes:

obtaining a third execution result corresponding to the predicted structured query language;

performing semantic analysis on the predicted structured query language to obtain the semantic analysis result; and evaluating the accuracy of the predicted structured query language based on the third execution result and the semantic analysis result to obtain the evaluation result corresponding to the predicted structured query language.

Specifically, in the absence of the target structured query language (SQL) statement as a reference, the solution evaluates the accuracy of the predicted structured query language by executing the predicted SQL and conducting in-depth semantic analysis. Firstly, the predicted SQL is executed to obtain the third execution result, which is an actual output of a database operation. Next, the natural language processing technique is used to perform the semantic analysis on the predicted SQL to understand its intent and logical structure, and obtain the semantic analysis result. Finally, a comprehensive evaluation of the accuracy of the predicted SQL is conducted based on the third execution result and the semantic analysis result. This evaluation process involves comparing whether the execution result is consistent with expected business logic, and whether semantics of the SQL correctly express the query needs of the user. The final evaluation result provides quantitative feedback on the accuracy of the predicted SQL.

In this way, by executing the predicted SQL to obtain an actual data output and then using a semantic analysis technique to understand the intent and logic of the statement, it ensures that the generated statement is not only grammatically correct, but also semantically match the query needs of the user. By comprehensively considering the execution result and the semantic analysis result, the accuracy of the predicted SQL can be more accurately evaluated, thereby providing strong support for optimizing the language model and improving the quality of SQL generation.

In some optional embodiments, evaluating the accuracy of the predicted structured query language based on the third execution result and the semantic analysis result to obtain the evaluation result corresponding to the predicted structured query language includes:

obtaining target semantic features needed by the user;

matching semantic features in the semantic analysis result with the target semantic features, and performing evaluation by using the third execution result, to obtain second preliminary evaluation results; and obtaining the evaluation result corresponding to the predicted structured query language based on the second preliminary evaluation results.

Specifically, the target semantic features needed by the user are firstly obtained, which are key elements of the query intent of the user, such as a specific data field, a query condition and the like. Next, the semantic features extracted from the semantic analysis result of the predicted SQL are matched with the target semantic features needed by the user, which ensures that logic of statement generation is consistent with the user's needs. In addition, further verification and evaluation are performed on these matched semantic features by combining the third execution result of the predicted SQL, which is an output of an actual database query, to obtain the second preliminary evaluation results. Finally, based on the second preliminary evaluation results, the final evaluation result is obtained. The entire process improves the accuracy of SQL generation by accurately matching the semantic features and verifying the execution result, ensuring efficient data processing and precise satisfaction of the user's needs.

In this way, by obtaining the target semantic features needed by the user, the evaluation process is closely aligned with actual needs of the user. Then, the semantic analysis result of the predicted SQL is matched with the target semantic features, and verification is performed by using the third execution result. This step not only verifies semantic correctness of the statement, but also ensures consistency between the execution result and the user's needs. Finally, based on the second preliminary evaluation results, the obtained evaluation result provides comprehensive quantitative feedback on the accuracy of the predicted SQL. The method not only improves the accuracy of SQL generation, but also enhances the system's intelligence and the user's trust, ensuring efficient data processing and precise satisfaction of the user needs.

In some optional embodiments, obtaining the evaluation result corresponding to the predicted structured query language based on the second preliminary evaluation results includes:

obtaining a quantity of correct evaluations in the second preliminary evaluation results;

calculating a ratio between the quantity of the correct evaluations and a total quantity of the second preliminary evaluation results, and taking the ratio as the evaluation result corresponding to the predicted structured query language.

Specifically, after obtaining the second preliminary evaluation results, as the second preliminary evaluation results include both correctly evaluated and incorrectly evaluated results, the embodiments of the present disclosure need to count the quantity of the correct evaluations results from the second preliminary evaluation results, that is, a quantity of cases where the predicted SQL perfectly matches the user's needs in terms of syntax and execution results. Subsequently, the quantity of the correct evaluations is compared with the total quantity of the second preliminary evaluation results to calculate the ratio, which reflects a percentage of correctness of the predicted SQL in all evaluation items. Finally, the ratio is used as the final evaluation result of the predicted SQL, providing a quantitative measure of the accuracy of the predicted statement. The method makes the evaluation result more objective and accurate, which helps further optimize the language model, improve the accuracy of SQL generation, and ensure that the generated SQL can meet actual query needs of the user.

In this way, by carefully analyzing the second preliminary evaluation results, the quantity of the correct evaluations is identified, that is, cases where the predicted statements match the user's needs in logic and execution, and then the ratio of the correct evaluations in all evaluation items is calculated, which provides an intuitive indicator to measure the overall performance of the predicted SQL, thereby providing data support for model optimization and adjustment. In the end, the ratio serves as the evaluation result of the predicted SQL, which not only enhances objectivity and accuracy of evaluation, but also improves the reliability of the automatic SQL generation system, ensuring that the query needs of the user are effectively met.

In order to facilitate a comprehensive understanding of the technical solution of the present disclosure, refer to FIG. 2, which is a flow schematic diagram corresponding to the structured query language evaluation method in embodiments of the present disclosure. The method includes:

Firstly, the query question input by the user is firstly received, and the SQL (also known as the predicted SQL) is generated based on the query question. Next, it determines whether the query question has a standard SQL (also known as the target SQL), and decides to use one of two different evaluation paths: if there is the standard SQL, the execution results of the standard SQL and the generated SQL in the database are obtained, the consistency between the SQLs and the execution results are compared by using the large language model, and then the accuracy of the generated SQL is calculated; if there is no standard SQL, the execution result of the generated SQL in the database is obtained, the semantic analysis is performed on the SQL by using the large language model, a semantic representation of the SQL is evaluated by using the large language model, and the accuracy of the generated SQL is finally calculated.

It can be seen that the present disclosure proposes a dual evaluation mechanism that can effectively evaluate the accuracy of the SQL regardless of whether there is the standard SQL, thereby significantly improving applicability of the method. Secondly, the present disclosure introduces the large language model to compare the consistency between the SQLs and the execution results. The method can more accurately evaluate the accuracy of the generated SQL, and compared to a traditional matching method, it has higher accuracy and robustness. Furthermore, the method of the present disclosure can effectively evaluate the accuracy of the SQL in a complex enterprise environment with limited data or a lack of standard SQL, making it more widely applicable, which is of great significance to data querying and processing in an enterprise application scenario. The method of the present invention can automatically generate the SQL and perform evaluation, reducing manual intervention and improving efficiency and objectivity of evaluation.

The following introduces apparatus embodiments of the present application, which may be used to perform the structured query language evaluation method in the above embodiments of the present application. For details not disclosed in the embodiments of the present application, please refer to the embodiments of the structured query language evaluation method described above in the present application.

Figure 3:
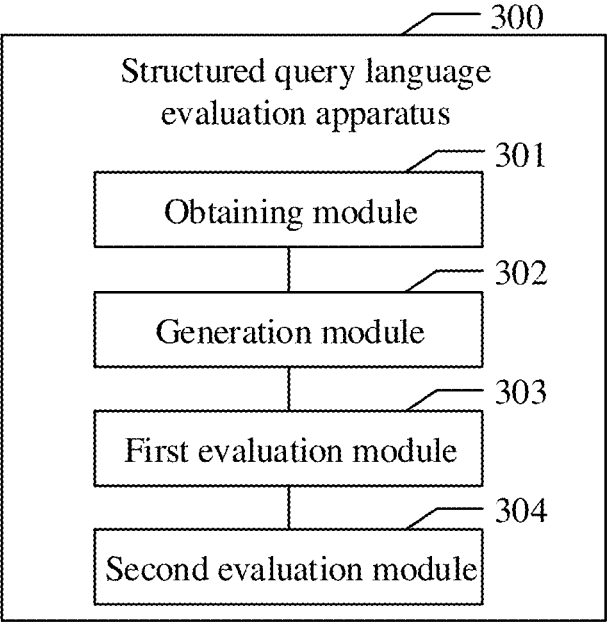
FIG. 3 is a principle block diagram of a structured query language evaluation apparatus in embodiments of the present disclosure.

The present disclosure further provides a structured query language evaluation apparatus 300 applied to a vehicle terminal. As shown in FIG. 3, the apparatus includes following modules.

An obtaining module 301 is configured to obtain a query question input by a user.

A generation module 302 is configured to generate a predicted structured query language corresponding to the query question based on the query question by using a large language model.

A first evaluation module 303 is configured to, in presence of a target structured query language corresponding to the query question, evaluate accuracy of the predicted structured query language based on the predicted structured query language and the target structured query language to obtain an evaluation result corresponding to the predicted structured query language.

A second evaluation module 304 is configured to, in absence of the target structured query language corresponding to the query question, evaluate the accuracy of the predicted structured query language based on a semantic analysis result of the predicted structured query language to obtain the evaluation result corresponding to the predicted structured query language.

In some optional embodiments, evaluating the accuracy of the predicted structured query language based on the predicted structured query language and the target structured query language to obtain the evaluation result corresponding to the predicted structured query language by the first evaluation module 303 includes:

obtaining a first execution result corresponding to the predicted structured query language;

obtaining a second execution result corresponding to the target structured query language; and evaluating the accuracy of the predicted structured query language based on the first execution result and the second execution result to obtain the evaluation result corresponding to the predicted structured query language.

In some optional embodiments, evaluating the accuracy of the predicted structured query language based on the first execution result and the second execution result to obtain the evaluation result corresponding to the predicted structured query language by the first evaluation module 303 includes:

comparing the predicted structured query language and the target structured query language in terms of syntax to obtain a first comparison result;

comparing consistency between the first execution result and the second execution result to obtain a second comparison result;

obtaining first preliminary evaluation results based on the first comparison result and the second comparison result; and obtaining the evaluation result corresponding to the predicted structured query language based on the first preliminary evaluation results.

In some optional embodiments, obtaining the evaluation result corresponding to the predicted structured query language based on the first preliminary evaluation results by the first evaluation module 303 includes:

obtaining a quantity of correct evaluations in the first preliminary evaluation results; and calculating a ratio between the quantity of the correct evaluations and a total quantity of the first preliminary evaluation results, and taking the ratio as the evaluation result corresponding to the predicted structured query language.

In some optional embodiments, evaluating the accuracy of the predicted structured query language based on the semantic analysis result of the predicted structured query language to obtain the evaluation result corresponding to the predicted structured query language by the second evaluation module 304 includes:

obtaining a third execution result corresponding to the predicted structured query language;

performing semantic analysis on the predicted structured query language to obtain the semantic analysis result; and evaluating the accuracy of the predicted structured query language based on the third execution result and the semantic analysis result to obtain the evaluation result corresponding to the predicted structured query language.

In some optional embodiments, evaluating the accuracy of the predicted structured query language based on the third execution result and the semantic analysis result to obtain the evaluation result corresponding to the predicted structured query language by the second evaluation module 304 includes:

obtaining target semantic features needed by the user;

matching semantic features in the semantic analysis result with the target semantic features, and performing evaluation by using the third execution result, to obtain second preliminary evaluation results; and obtaining the evaluation result corresponding to the predicted structured query language based on the second preliminary evaluation results.

In some optional embodiments, obtaining the evaluation result corresponding to the predicted structured query language based on the second preliminary evaluation results by the second evaluation module 304 includes:

obtaining a quantity of correct evaluations in the second preliminary evaluation results; and calculating a ratio between the quantity of the correct evaluations and a total quantity of the second preliminary evaluation results, and taking the ratio as the evaluation result corresponding to the predicted structured query language.

In the technical solution of the present disclosure, acquisition, storage and application of the user's personal information involved are all in compliance with provisions of relevant laws and regulations, and do not violate public order and good customs.

According to the embodiment of the present disclosure, the present disclosure further provides an electronic device, a readable storage medium and a computer program product.

Figure 4:
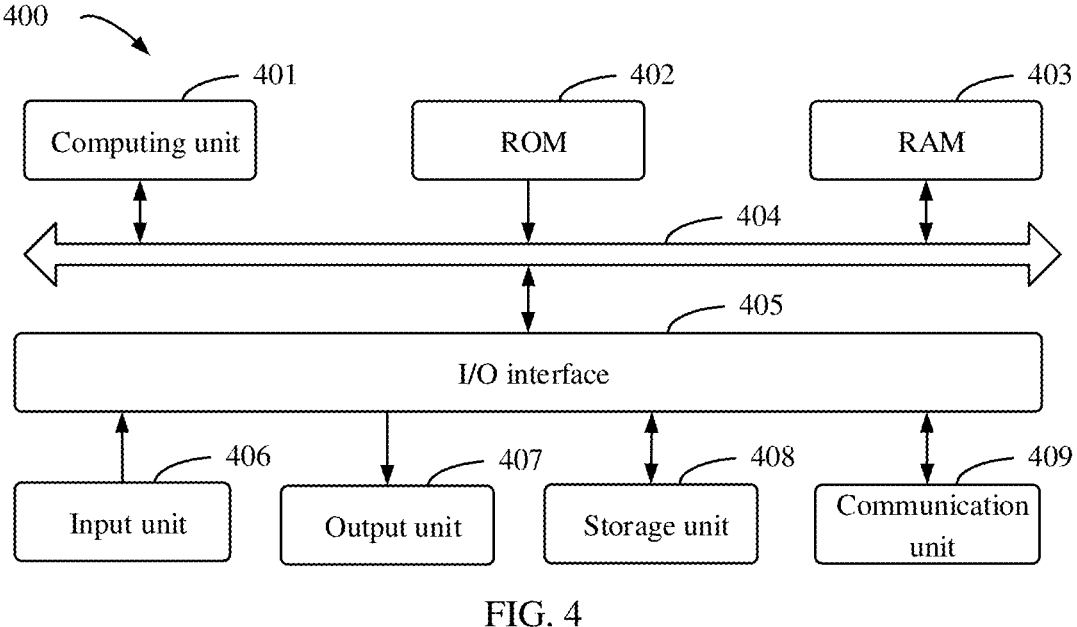
FIG. 4 is a block diagram of an electronic device for achieving a structured query language evaluation method in embodiments of the present disclosure.

FIG. 4 shows a schematic block diagram of an exemplary electronic device 400 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 4, the electronic device 400 includes a computing unit 401 that may perform various appropriate actions and processes according to a computer program stored in a Read-Only Memory (ROM) 402 or a computer program loaded from a storage unit 408 into a Random Access Memory (RAM) 403. Various programs and data required for an operation of device 400 may also be stored in the RAM 403. The computing unit 401, the ROM 402 and the RAM 403 are connected to each other via a bus 404. The input/output (I/O) interface 405 is also connected to the bus 404.

A plurality of components in the device 400 are connected to the I/O interface 405, and include an input unit 406 such as a keyboard, a mouse, or the like; an output unit 407 such as various types of displays, speakers, or the like; the storage unit 408 such as a magnetic disk, an optical disk, or the like; and a communication unit 409 such as a network card, a modem, a wireless communication transceiver, or the like. The communication unit 409 allows the device 400 to exchange information/data with other devices through a computer network such as the Internet and/or various telecommunication networks.

The computing unit 401 may be various general-purpose and/or special-purpose processing components with processing and computing capabilities. Some examples of the computing unit 401 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 401 performs various methods and processings described above, such as the structured query language evaluation method. For example, in some implementations, the structured query language evaluation method may be implemented as a computer software program tangibly contained in a computer-readable medium, such as the storage unit 408. In some implementations, a part or all of the computer program may be loaded and/or installed on the device 400 via the ROM 402 and/or the communication unit 409. When the computer program is loaded into the RAM 403 and executed by the computing unit 401, one or more steps distributed by the applets described above may be performed. Alternatively, in other implementations, the computing unit 401 may be configured to perform the structured query language evaluation method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of apparatuses may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware component, or in a computing system including a front-end component (e.g., a user computer with a graphical user interface or a web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and the server are generally far away from each other and usually interact with each other via a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure may be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A structured query language evaluation method, comprising:

obtaining a query question input by a user;

generating a predicted structured query language (SQL) corresponding to the query question based on the query question by using a large language model;

determining whether there is a SQL corresponding to the query question, wherein the SQL is pre-defined and directly corresponds to the query question;

in presence of the SQL corresponding to the query question:

obtaining a first execution result corresponding to the predicted SQL;

obtaining a second execution result corresponding to the SQL;

comparing the predicted SQL and the SQL to check consistency of the predicted SQL and the SQL in terms of structure and syntax rule, to obtain a first comparison result;

verifying whether the first execution result and the second execution result return same or logically equivalent data, to obtain a second comparison result;

obtaining first preliminary evaluation results based on the first comparison result and the second comparison result, the first preliminary evaluation results comprehensively evaluating syntax correctness of the predicted SQL and consistency of execution results of the predicted SQL and SQL;

obtaining a quantity of correct evaluations in the first preliminary evaluation results;

calculating a ratio between the quantity of the correct evaluations and a total quantity of the first preliminary evaluation results; and taking the ratio as the evaluation result corresponding to the predicted SQL; and in absence of the SQL:

obtaining a third execution result corresponding to the predicted SQL;

performing semantic analysis on the predicted SQL to obtain a semantic analysis result; and evaluating an accuracy of the predicted SQL based on the third execution result and the semantic analysis result to obtain the evaluation result corresponding to the predicted SQL.

2. The method of claim 1, wherein evaluating the accuracy of the predicted SQL based on the third execution result and the semantic analysis result to obtain the evaluation result corresponding to the predicted SQL comprises:

obtaining target semantic features needed by the user;

matching semantic features in the semantic analysis result with the target semantic features, and performing evaluation by using the third execution result, to obtain second preliminary evaluation results; and obtaining the evaluation result corresponding to the predicted SQL based on the second preliminary evaluation results.

3. The method of claim 2, wherein obtaining the evaluation result corresponding to the predicted SQL based on the second preliminary evaluation results comprises:

obtaining a quantity of correct evaluations in the second preliminary evaluation results; and calculating a ratio between the quantity of the correct evaluations and a total quantity of the second preliminary evaluation results, and taking the ratio as the evaluation result corresponding to the predicted SQL.

4. An electronic device, comprising:

at least one processor; and a memory connected in communication with the at least one processor;

wherein the memory stores an instruction executable by the at least one processor, and the instruction, when executed by the at least one processor, enables the at least one processor to execute:

obtaining a query question input by a user;

generating a predicted structured query language (SQL) corresponding to the query question based on the query question by using a large language model;

determining whether there is a SQL corresponding to the query question, wherein the SQL is pre-defined and directly corresponds to the query question;

in presence of the SQL corresponding to the query question:

obtaining a first execution result corresponding to the predicted SQL;

obtaining a second execution result corresponding to the SQL;

comparing the predicted SQL and the SQL to check consistency of the predicted SQL and the SQL in terms of structure and syntax rule, to obtain a first comparison result;

verifying whether the first execution result and the second execution result return same or logically equivalent data, to obtain a second comparison result;

obtaining first preliminary evaluation results based on the first comparison result and the second comparison result, the first preliminary evaluation results comprehensively evaluating syntax correctness of the predicted SQL and consistency of execution results of the predicted SQL and SQL;

obtaining a quantity of correct evaluations in the first preliminary evaluation results;

calculating a ratio between the quantity of the correct evaluations and a total quantity of the first preliminary evaluation results; and taking the ratio as the evaluation result corresponding to the predicted SQL; and in absence of the SQL:

obtaining a third execution result corresponding to the predicted SQL;

performing semantic analysis on the predicted SQL to obtain a semantic analysis result; and evaluating the accuracy of the predicted SQL based on the third execution result and the semantic analysis result to obtain the evaluation result corresponding to the predicted SQL.

5. The electronic device of claim 4, wherein evaluating the accuracy of the predicted SQL based on the third execution result and the semantic analysis result to obtain the evaluation result corresponding to the predicted SQL comprises:

obtaining target semantic features needed by the user;

matching semantic features in the semantic analysis result with the target semantic features, and performing evaluation by using the third execution result, to obtain second preliminary evaluation results; and obtaining the evaluation result corresponding to the predicted SQL based on the second preliminary evaluation results.

6. The electronic device of claim 5, wherein obtaining the evaluation result corresponding to the predicted SQL based on the second preliminary evaluation results comprises:

obtaining a quantity of correct evaluations in the second preliminary evaluation results; and calculating a ratio between the quantity of the correct evaluations and a total quantity of the second preliminary evaluation results, and taking the ratio as the evaluation result corresponding to the predicted SQL.

7. A non-transitory computer-readable storage medium storing a computer instruction thereon, wherein the computer instruction is used to cause a computer to execute:

obtaining a query question input by a user;

generating a predicted structured query language (SQL) corresponding to the query question based on the query question by using a large language model;

determining whether there is a SQL corresponding to the query question, wherein the SQL is pre-defined and directly corresponds to the query question;

in presence of the SQL corresponding to the query question:

obtaining a first execution result corresponding to the predicted SQL;

obtaining a second execution result corresponding to the SQL;

comparing the predicted SQL and the SQL to check consistency of the predicted SQL and the SQL in terms of structure and syntax rule, to obtain a first comparison result;

verifying whether the first execution result and the second execution result return same or logically equivalent data, to obtain a second comparison result;

obtaining first preliminary evaluation results based on the first comparison result and the second comparison result, the first preliminary evaluation results comprehensively evaluating syntax correctness of the predicted SQL and consistency of execution results of the predicted SQL and SQL;

obtaining a quantity of correct evaluations in the first preliminary evaluation results;

calculating a ratio between the quantity of the correct evaluations and a total quantity of the first preliminary evaluation results; and taking the ratio as the evaluation result corresponding to the predicted SQL; and in absence of the SQL:

obtaining a third execution result corresponding to the predicted SQL;

performing semantic analysis on the predicted SQL to obtain a semantic analysis result; and evaluating the accuracy of the predicted SQL based on the third execution result and the semantic analysis result to obtain the evaluation result corresponding to the predicted SQL.

8. The non-transitory computer-readable storage medium of claim 7, wherein evaluating the accuracy of the predicted SQL based on the third execution result and the semantic analysis result to obtain the evaluation result corresponding to the predicted SQL comprises:

obtaining target semantic features needed by the user;

matching semantic features in the semantic analysis result with the target semantic features, and performing evaluation by using the third execution result, to obtain second preliminary evaluation results; and obtaining the evaluation result corresponding to the predicted SQL based on the second preliminary evaluation results.

9. The non-transitory computer-readable storage medium of claim 8, wherein obtaining the evaluation result corresponding to the predicted SQL based on the second preliminary evaluation results comprises:

obtaining a quantity of correct evaluations in the second preliminary evaluation results; and calculating a ratio between the quantity of the correct evaluations and a total quantity of the second preliminary evaluation results, and taking the ratio as the evaluation result corresponding to the predicted SQL.

* * * * *